March 28, 1939.  A. J. LIEBMANN  2,152,318
METHOD OF MAKING GIN
Filed Sept. 29, 1936
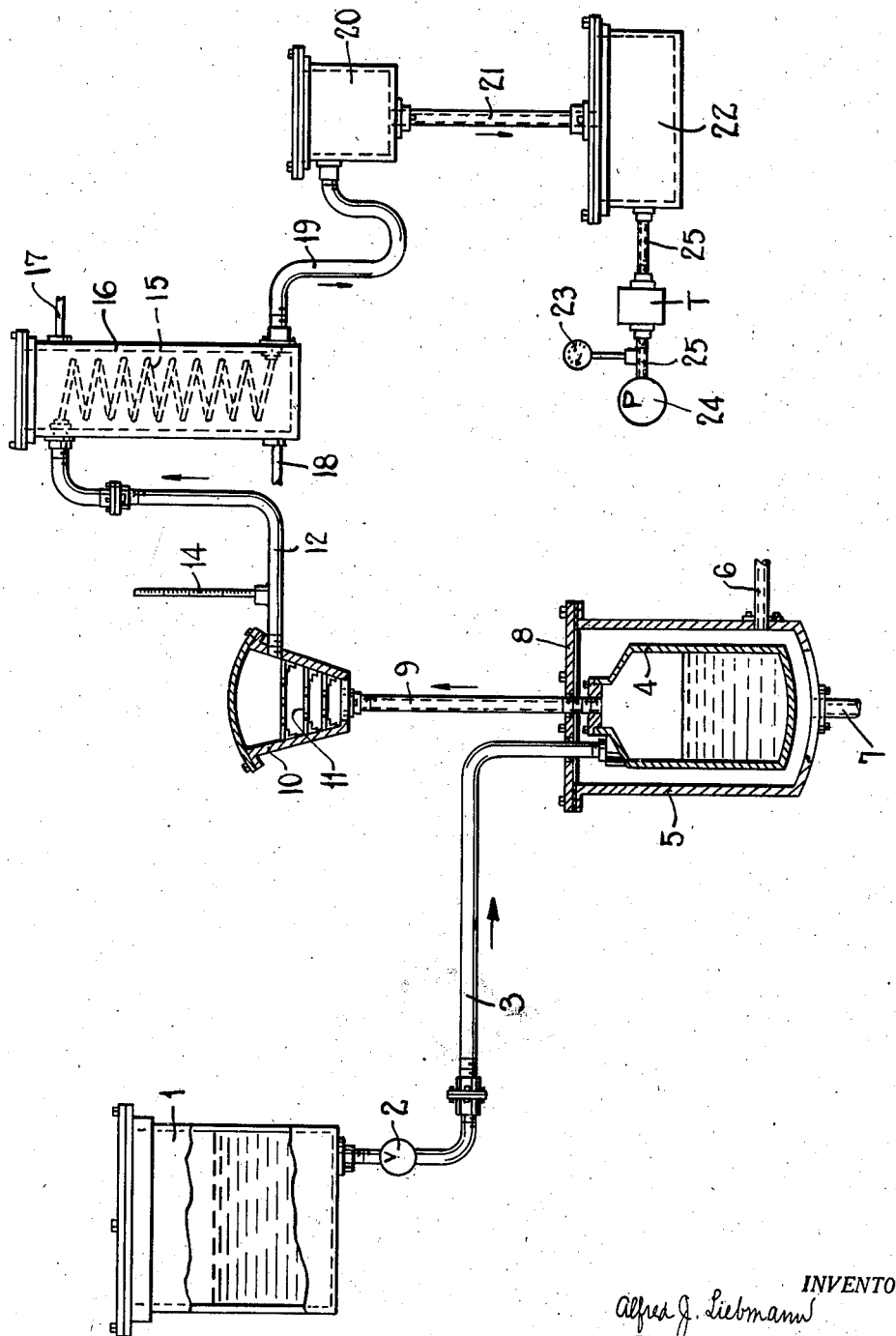
INVENTOR.
Alfred J. Liebmann
BY Mock & Blum
ATTORNEYS.

Patented Mar. 28, 1939

2,152,318

UNITED STATES PATENT OFFICE 2,152,318

METHOD OF MAKING GIN

Alfred J. Liebmann, New York, N. Y.

Application September 29, 1936, Serial No. 103,091

3 Claims. (Cl. 99—34)

My invention relates to a new and improved method for the manufacture of gin, and improved apparatus for the manufacture of gin, and it also relates to an improved gin.

One of the objects of my invention is to regulate the distillation of the gin, by properly coordinating various factors, especially the temperature and vapor pressure which prevails in the still, so as to extract the desirable flavoring ingredients from the flavoring materials, while eliminating the extraction of certain undesirable ingredients from the flavoring materials.

Another object of my invention is to provide a method whereby the gin or the spirits are distilled at a proper temperature and pressure so as to regulate the removal of the flavoring ingredients from the flavoring materials.

Another object of my invention is to provide a gin of improved composition.

Other objects of my invention will be set forth in the following description and drawing, which illustrate a preferred embodiment of the invention, it being understood that the above statement of the objects of my invention is intended generally to explain the same without limiting it in any manner. It is to be understood that the annexed drawing is largely diagrammatic, and it shows one form of apparatus which may be used for practicing the invention.

It has been well known for many years to prepare a gin by distilling alcoholic spirits over flavoring materials, which contain certain essential oils which are extracted during the process of distillation, so as to impart the desired flavor and aroma to the alcoholic spirits. The flavoring materials which are generally used are the following:

Juniper berries; coriander seed; cardamon seed; angelica root; anise seed; bitter almonds; caraway seed; calamus; cassia bark; fennel; orris root, licorice; sweet and bitter orange peel; buchu leaves; sloe berries.

The original Dutch process consisted in distilling a mash which consisted of rye, corn and malt, with which juniper berries had been mixed.

The well known English process consists in first separating the alcohol from the mash by means of distillation, and then subsequently redistilling the high wines so obtained, in a pot still, over juniper berries and other flavoring materials.

In order to do this, the pot still has been equipped with a so-called "gin head" which is merely a chamber equipped with trays, on which the berries and other flavoring materials are spread. These trays are preferably perforated. According to this method, the liquid spirits do not touch any of the flavoring materials, and the aromatic constituents of these flavoring materials are extracted, solely by the vapor of the alcohol.

I have discovered that in making gin a very important factor is the temperature and pressure at which the still is operated, in order to extract the desired ingredients.

If the temperature within the still is too low, sufficient essential oils or other flavoring ingredients are not extracted from the flavoring materials.

If the temperature of distillation is too high, or if the operation is carried on for too long a time, then the berries and herbs and other flavoring materials will give off substances which impart very undesirable properties to the product.

According to the preferred form of my invention, the alcohol or neutral spirits are distilled at a sufficiently low pressure, by using a distillation temperature of between 50° C. to 60° C., instead of using the present normal temperature of 78° C. and the pressure which corresponds thereto. I can use said relatively low temperature, together with the relatively low pressure which corresponds thereto, by means of a process of vacuum distillation.

I prefer to use a distillation temperature which does not substantially exceed 60° C. and which preferably equals 60° C. I prefer to use neutral spirits or high wines of 100 proof. This neutral spirit consists of a mixture of alcohol and water and it contains substantially 50% of alcohol by volume, and substantially 42% of alcohol by weight. The boiling point of ethyl alcohol at 760 mm. is approximately 78° C. This proof spirit has a boiling point at a pressure of 760 mm. of approximately 81° C. to 82° C. At 60° C. the vapor pressure of alcohol is approximately 350 mm. of mercury and the vapor pressure of water at said temperature of 60° C., is approximately 149 mm. of mercury. Hence the pressure of distillation is approximately 499 mm. of mercury.

Referring to the annexed diagrammatic drawing, this shows a tank 1, which serves as a storage tank for the neutral spirits. This tank is connected through a hand-valve 2, to a pipe 3 which is connected to a still 4.

In this specific embodiment I have shown a pot still. This pot still is provided with a steam jacket, and a steam inlet pipe 6 is provided for this steam jacket 5. Said steam jacket is provided with an outlet pipe 7, which may be provided with a valve, as desired.

The steam jacket 5 is provided with a cover 8. The vapor of the spirits ascends through the pipe 9, and the vapor then enters the berry chamber or gin head 10. Said gin head 10 is provided with perforated shelves 11, on which the flavoring materials are spread out. The gin head 10 is connected by means of a pipe 12 (provided with a thermometer 14) to a worm 15, which serves as the condensing worm. The thermometer 14 should record a temperature of between 50° C. to 60° C., preferably 60° C. This is the temperature in the gin head 10. The condensing worm is located within any ordinary condensing chamber 16, which may be provided with an inlet 18 for cold water or the like, and which may also be provided with an outlet 17. Any conventional type of condensing apparatus can be used. The condensed vapors pass through the pipe 19 to the tail box 20, which may be of any suitable type. The heads and tails which result from the distillation process may be cut off or used in any suitable manner. Of course the "heads" and the "tails" refer to the first and last parts resulting from the distillation process. They may contain too high a percentage of foreign matter and they can therefore be separated and redistilled.

The gin passes through a pipe 21 to a receiver 22, in which the finished gin is collected. The gin receiver 22 is connected to a pipe 25, which is provided with a trap T, to a suction or vacuum pump 24. This pump is operated so as to maintain the desired temperature and pressure within the still and gin head. This pump is ordinarily operated continuously. The pipe line 25 is provided with any suitable pressure gauge 23, intermediate the trap T and the suction pump 24. The function of the trap T is to prevent any loss of gin, due to the suction effect of the pump 24. Any suitable type of trap may be used. That is, the action of the suction pump may evaporate some of the gin within the receiver 22, and the trap T may be of any suitable type, so as to prevent loss of gin vapor. The suction pump may be connected to the apparatus at any suitable point after the gin-head 10, but the position of the pump shown herein is the preferred position.

A comparison of the improved gin, with an ordinary standard gin may be made as follows:

|  | Ordinary gin | Gin made by the improved process |
|---|---|---|
| Proof | 99.0 | 98.3 |
| Acids: |  |  |
| Total | 0.73 | 0.50 |
| Volatile | 0.73 | 0.50 |
| Fixed | 0.00 | 0.00 |
| Esters | 0.00 | 0.00 |
| Aldehydes | Trace | 0.00 |
| Fusel oil | 6.89 | 4.87 |
| Extract | 1.82 | 0.00 |

The above figures state the respective weights of the respective secondary products in the customary manner, namely, per 100 liters of the gin. For example, 100 liters of the improved gin contain only 4.87 grams of fusel oil, as compared with 6.89 grams per 100 liters of ordinary gin. The weight of 100 liters of alcohol and water, of 98.3 proof, is approximately 93,611 grams. Hence the improved gin has about 0.005 per cent of volatile acids, and about 0.05 per cent of fusel oil. The total weight of the secondary ingredients, per 100 liters of gin, is only 5.87 grams.

Gin of 98.3 proof has substantially 41 per cent of alcohol by weight. Therefore, based upon the weight of the alcohol alone, the improved gin has about 0.002 per cent of volatile acids and about 0.02 per cent of fusel oil and the secondary ingredients are about 0.022 per cent of the weight of the alcohol.

It will be noted that the improved product is wholly free from aldehydes, that it has a much smaller percentage of fusel oil than the ordinary product, and that the improved product is substantially free from the extract. Since the extract often contains undesirable products, it is preferable to eliminate the same.

This analysis is given as a typical example, but I want it clearly understood that I should not be limited to a product showing these exact constituents. By choosing different combinations of botanicals and by adjusting accordingly the coordinated temperature and pressure the analysis of the resultant product will of course be changed.

I am aware of the fact that U. S. Patent No. 61,313 has been issued on January 22, 1867 to Daniel Jay Browne and Steuben T. Bacon. However, this related solely to a method of making a brandy with the use of sorghum sirup and with the use of a vacuum still, and this does not have any relation to the production of gin. Likewise the pressure of distillation is not specified in said U. S. Patent No. 61,313.

While I prefer to use the method of manufacture in which the vapor of the spirits is caused to contact with the berries, seeds, roots, and other flavoring materials, I do not wish to exclude from the scope of the invention the use of the original Dutch process in which the roots or berries or other flavoring materials are added directly to the mash.

It has been proposed to treat distilled alcoholic beverages so as to remove certain undesirable ingredients, by means of an after-distillation. This after treatment was expensive and it removed some of the volatile flavoring ingredients. The improved process controls the primary distillation in which the alcohol takes up the flavoring ingredients. The result product may be designated as a primary distilled gin.

I have described a preferred embodiment of my invention, but I do not wish to be limited to the details thereof.

I claim:

1. In the art of making gin, that step which consists in contacting alcohol vapor of substantially neutral spirits with flavoring material and to extract a flavoring ingredient from said flavoring material, at a temperature substantially between 50° C. and 60° C.

2. In the art of making gin, that step which consists in distilling a mixture which consists substantially of alcohol and water at a pressure which does not substantially exceed 500 mm. of mercury, while contacting the vapors of said mixture with flavoring material, and to extract flavoring ingredients from said flavoring material.

3. In the art of making gin, that step which consists in heating substantially neutral spirits to a temperature of substantially 60° C. and at a pressure of substantially 500 mm. of mercury, and contacting the vapor resulting from such heating and at said pressure with flavoring material so as to extract flavoring ingredients therefrom, without taking up substantially any extract.

ALFRED J. LIEBMANN.